United States Patent

[11] 3,611,082

[72] Inventor  Norbert L. Schmitz
               Middleton, Wis.
[21] Appl. No. 884,934
[22] Filed     Dec. 15, 1969
[45] Patented  Oct. 5, 1971
[73] Assignee  Wisconsin Alumni Research Foundation
               Madison, Wis.

[54] VARIABLE SPEED ELECTRIC MOTOR SYSTEM HAVING STATOR AND ROTOR WINDINGS ENERGIZED IN OPPOSITE PHASE SEQUENCE WITH ALTERNATING CURRENT CORRESPONDING IN ANGULAR VELOCITY TO ONE-HALF THE ANGULAR VELOCITY OF THE ROTOR
15 Claims, 6 Drawing Figs.

[52] U.S. Cl. .................................. 318/187,
                                              318/197, 318/205
[51] Int. Cl. .................................. H02p 7/46
[50] Field of Search ......................... 318/138,
                                              187, 197, 205

[56]         References Cited
             UNITED STATES PATENTS
2,896,143  7/1959  Bekey .................... 318/187 X
3,418,550  12/1968 Kolatorowicz et al. ...... 318/138
3,421,062  1/1969  Dickey ................... 318/187
3,448,363  6/1969  Pierro et al. ............ 318/197

Primary Examiner—Gene Z. Rubinson
Attorney—Burmeister, Palmatier & Hamby

ABSTRACT: The motor system utilizes a conventional wound rotor induction motor but achieves operating characteristics similar to those of a series field direct current motor. Both the stator coils and the rotor coils of the motor are supplied with alternating current power from a variable frequency power supply. However, the phase sequence of the rotor coils is reversed with respect to that of the stator coils. The voltage phase and the frequency of the power delivered to the motor are determined by a shaft position transducer coupled to the motor shaft. The adjustment of the transducer determines the torque angle between the alternating voltage phase and the position of the shaft. This torque angle is maintained constant at all speeds. The speed of the motor can be varied by varying the voltage of the alternating current supplied to the motor. A tachometer governor arrangement can be used to hold the speed constant. The shaft position transducer may utilize rotary variable capacitors supplied with a carrier signal, or magnetodiodes positioned adjacent to a rotary magnet.

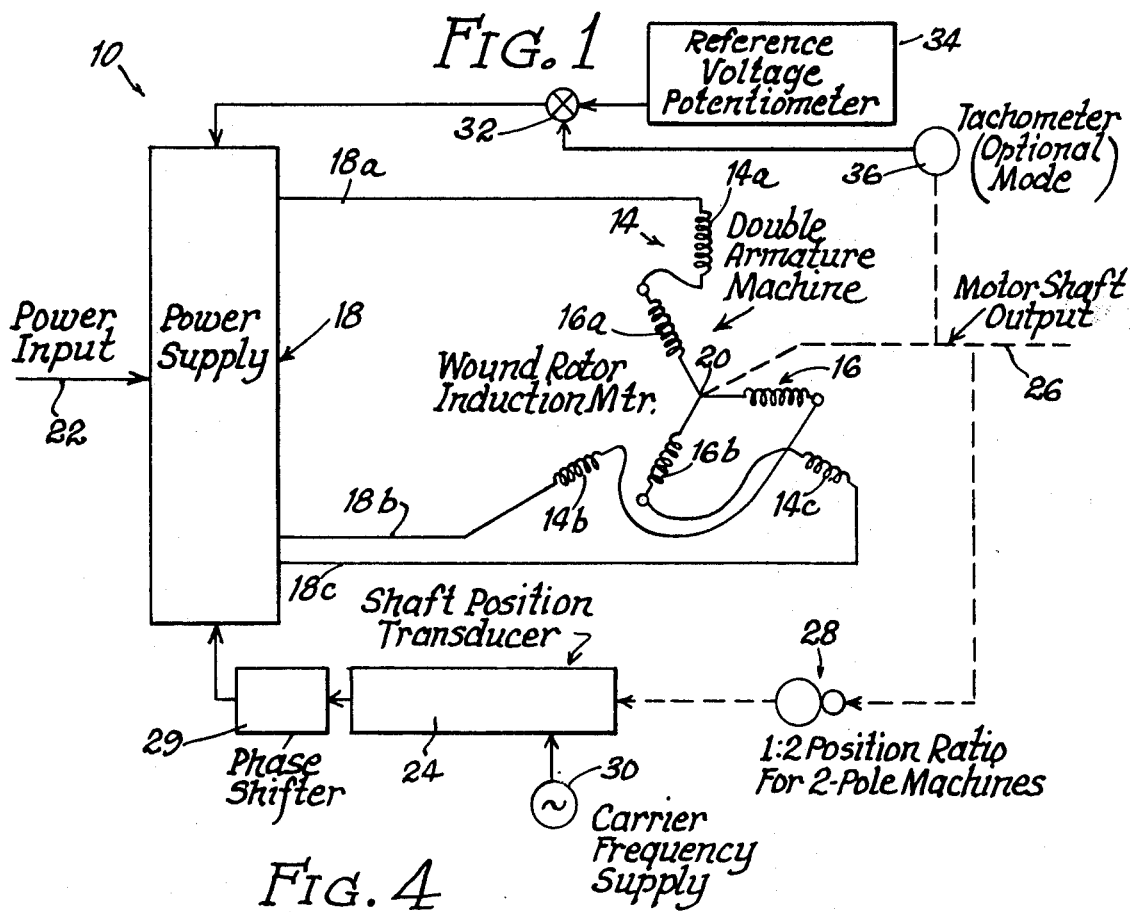
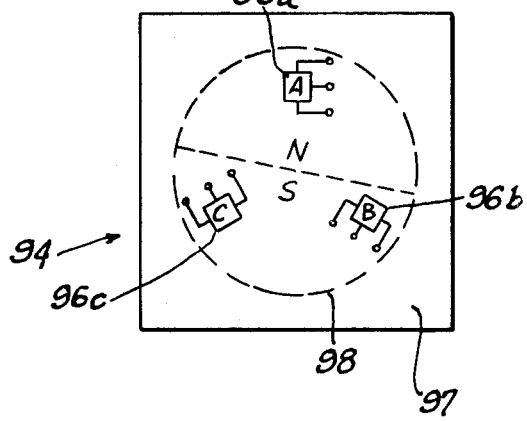
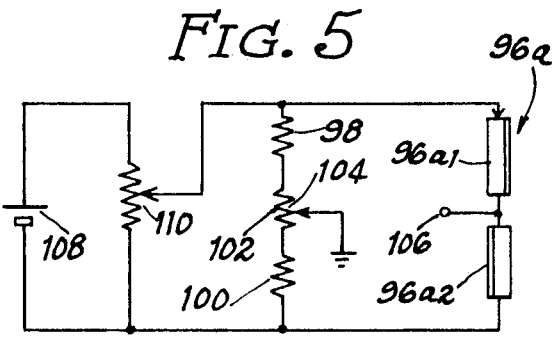

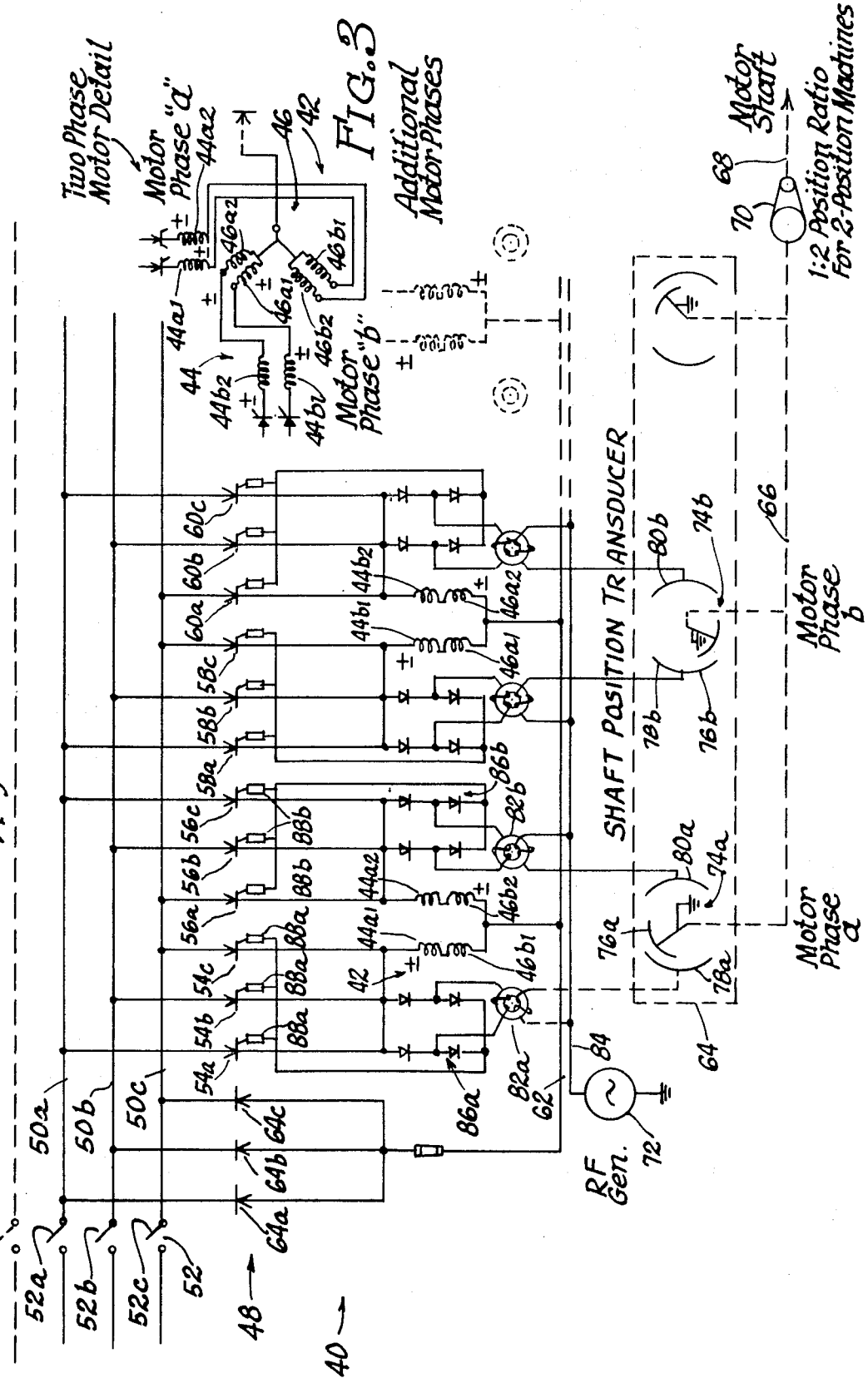

VARIABLE SPEED ELECTRIC MOTOR SYSTEM HAVING STATOR AND ROTOR WINDINGS ENERGIZED IN OPPOSITE PHASE SEQUENCE WITH ALTERNATING CURRENT CORRESPONDING IN ANGULAR VELOCITY TO ONE-HALF THE ANGULAR VELOCITY OF THE ROTOR

This invention relates to a variable speed electric motor system which utilizes an alternating current induction motor, but provides operating characteristics similar to those of a series field direct current motor. The motor system can be operated from either alternating current or direct current.

One of the objects of the present invention is to provide a variable speed electric motor system which utilizes an alternating current induction motor. The speed may be varied by changing either the supply voltage to the motor, or the transducer phase angle.

A further object is to provide a motor system utilizing an alternating current induction motor, yet providing high starting and overload torque capabilities, similar to those of a direct current series field motor.

Another object is to provide an electric motor system in which both the stator windings and rotor windings of the induction motor are supplied with power, whereby the motor is operated with improved efficiency, so that a high-power output can be obtained in relation to the size of the motor.

A further object is to provide an electric motor system utilizing an alternating current induction motor yet providing desirable speed-torque characteristics, corresponding to those of a direct current series field motor.

Another object is to provide a new and improved electric motor system utilizing a wound rotor alternating current machine, while avoiding the problems with pullout and hunting experienced with certain prior motor arrangements.

Thus, the present invention preferably comprises a plural phase double armature induction motor having a wound rotor, as well as a wound stator. Both the rotor and stator are employed as armatures. Alternating current power is fed to both the stator and rotor coils by a variable frequency power supply. The stator and rotor coils may be connected either in series or in parallel. The phase sequence of the rotor coils is reversed with respect to the sequence of the stator coils. The variable frequency power supply is controlled by signals from a shaft position transducer, connected to the shaft of the motor. The phase of the signals from the transducer has either a fixed or an adjustable relationship to the position of the rotor. The alternating voltage supplied to the motor by the power supply has the same phase as the signals from the transducer. As the motor picks up speed, this relationship remains constant for a constant transducer angle setting, while the frequency of the alternating current increases with the increasing speed. Means may be provided to vary the operating speed by varying the alternating current voltage. A tachometer governor arrangement may be employed to limit the operating speed and to hold it constant. Means may also be provided to control the speed-torque relationship by varying the phase at the alternating voltage relative to the shaft position, either by rotating the stator of the transducer or interposing electrical phase shifting means between transducer and motor power supply.

The power supply may be operated from either alternating or direct current. For use with an alternating current input, the power supply comprises a variable frequency cycloconverter, controlled by the signals from the shaft position transducer. For use with direct current, the power supply comprises an inverter system controlled by the signals from the transducer.

The shaft position transducer may utilize any device which provides output signals corresponding in phase to the position of the shaft. Thus, the transducer may comprise a rotary variable capacitor fed with a carrier signal. Alternatively, the transducer may comprise one or more magnetodiodes under the influence of a rotary magnet. The resistance of the magnetodiodes is thus varied in accordance with the position of the shaft.

Further objects, advantages and features of the present invention will appear from the following description, taken with the accompanying drawings in which:

FIG. 1 is a circuit diagram of an electric motor system to be described as an illustrative embodiment of the present invention.

FIG. 2 is a more detailed circuit diagram of a slightly modified electric motor system.

FIG. 3 is a diagram illustrating the details of a two-phase motor for use in the system of FIG. 2.

FIG. 4 is a diagrammatic elevation of a shaft position transducer utilizing magnetodiodes.

FIG. 5 is a circuit diagram of the shaft position transducer utilizing magnetodiodes.

Figure 6:
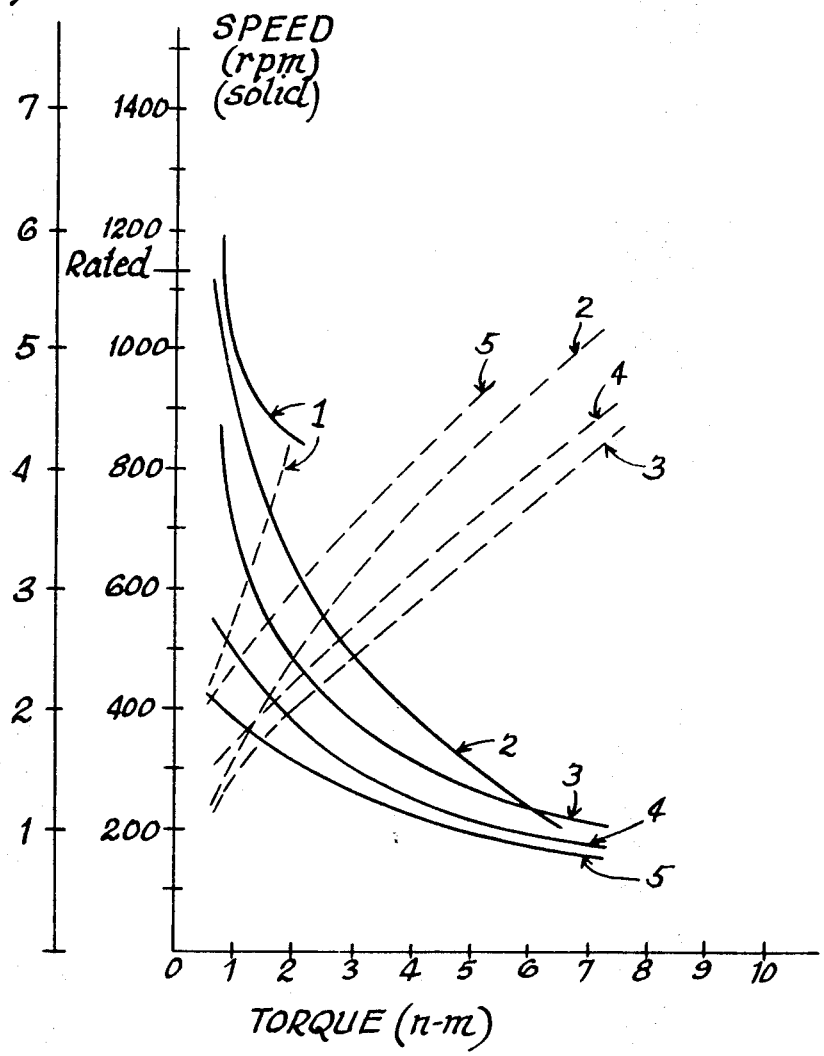
FIG. 6 is a set of graphs representing the operating characteristics of the electric motor system.

It will be seen that FIG. 1 illustrates an electric motor system 10 utilizing a double armature wound rotor induction motor 12. Thus, the motor 12 comprises a stator 14 having armature coils 14a, b and c. The motor 12 also has a wound rotor 16 with armature coils 16a, b and c. The illustrated motor 12 is of the three-phase type, but it will be understood that the invention is applicable to motors having any desired number of phases.

In this case, the stator and rotor coils are connected in series in a Y connection. However, the stator and rotor coils may also be connected in parallel, and in either a Y or delta connection.

Both the stator and rotor coils are energized by a variable frequency alternating current power supply 18, illustrated as having three output lines or phases 18a, b and c. While both the stator and rotor coils are energized from the lines 18a, b and c, the phase sequence of the rotor coils is reversed with respect to the sequence of the stator coils. Thus, the stator and rotor coils 14a and 16a are connected in series between the line 18a and the central junction 20 of the Y connection. Because of the reversed sequence, the stator coil 14b and the rotor coil 16c are connected in series between the line 18b and the junction 20. Likewise, the stator coil 14c and the rotor coil 16b are connected in series between the line 18c and the junction 20.

The input power to the power supply 18 may be either alternating current or direct current. As shown in FIG. 1, the power supply 18 receives its power from a power line 22. When a high-frequency (100-800 c.p.s.) power source is available. It is preferred to arrange the power supply 18 so that it may be energized from an alternating current power line, preferably with a plurality of phases, as will be described in greater detail in connection with FIG. 2. In that case, the power supply 18 acts as a frequency converter or cycloconverter. When the power supply 18 is energized from direct current, the power supply is arranged to act as an inverter having a variable frequency output.

The stator coils 14a, b and c produce a magnetic field which rotates in one direction relative to the stator coils. Due to the reversed connection of the rotor coils 16a, b and c, they produce a magnetic field which rotates in the opposite direction relative to the rotor coils. During operation, there is a tendency for the rotating fields to become aligned, with the result that the rotor 16 tends to rotate at a synchronous speed which is twice the speed of the rotating magnetic field produced by the stator coils 14a, b and c.

The phase and frequency of the alternating current output from the power supply 18 are determined by a shaft position transducer 24 having a mechanical connection to the rotor 16. The rotor 16 has an output shaft 26 which is coupled to the transducer 24. Thus, the phase and frequency of the output of the power supply 18 are determined by the instantaneous position of the motor shaft 26. As shown in FIG. 1, a speed changing device 28 is interposed between the motor shaft 26 and the transducer 24. For a two-pole machine, the speed change device 28 has a speed ratio of 1 to 2, so that the rotatable element of the transducer 24 is driven at one-half the speed of the shaft 26. This speed reduction is necessitated by the tendency of the rotor to rotate at a synchronous speed which is twice the rotary speed of the stator magnetic field. For a four-pole machine direct drive at 1:1 to a two-pole transducer is possible. For an eight-pole machine direct drive at 1:1 to a four-pole transducer is possible. Suitable speed relationships can be established for machines with any number of poles. Direct drive is possible when the number of poles is divisible by four.

The transducer 24 produces a signal which varies cyclically in accordance with the instantaneous rotor position. It will be understood that the angular velocity of such signal corresponds to one-half the angular velocity of the rotor, and that this relationship can be achieved mechanically, as by the mechanical speed change in the transducer drive, or electrically, as by the halving of the number of transducer poles, as explained above. This signal is delivered to the power supply 18 and is used to govern the phase and frequency of the alternating current output. An adjustable phase shifter 29 may be provided between the transducer 24 and the power supply so that the phase can be adjusted.

The shaft position transducer 24 may be of any suitable type. Thus, for example, it may be arranged to modulate a carrier signal in accordance with the shaft position. Accordingly, the transducer 24 of FIG. 1 is supplied with such a signal by a carrier frequency supply 30. This type of transducer will be described in greater detail in connection with FIG. 2. The transducer 24 may also utilize solid-state diodes which are magnetically responsive. A transducer of this type will be described in greater detail in connection with FIGS. 4 and 5. An electromagnetic transducer can also be employed.

With the arrangement shown in FIG. 1, the operating speed of the motor 12 is determined by the input voltage, transducer angle setting and the mechanical load connected to the shaft of the motor. Thus, the speed can be varied by changing either the input voltage or the torque angle. As shown in FIG. 1, a voltage control device 32 is connected to the power supply 18. Such device may be of the electronic switching type or of any other known or suitable type. The voltage control device 32 may be arranged to regulate the output voltage of the power supply 18 in accordance with a variable reference voltage from an adjustable potentiometer 34, or any other suitable source.

Automatic speed regulation may be achieved by operating the voltage varying device 32 from a reference signal drive from a tachometer 36, connected to the rotor shaft 26. With this arrangement, the rotor speed can be stabilized to any desired operating value.

FIG. 2 is a more detailed illustration of a somewhat modified electric motor system 40 utilizing an induction motor 42. For illustrative purposes, the motor 42 is shown as the two-phase type, but it will be understood that the invention is applicable to three-phase motors, and also to motors of any desired number of phases.

The two-phase motor 42 is shown in detail in FIG. 3. It will be seen that the motor 42 has a stator 44 with two coils for each phase. Thus, the stator 44 comprises coils 44a1, 44a2, 44b1 and 44b2. The motor 42 also comprises a rotor 46 having two coils for each phase. Such coils are designated as 46a1, 46a2, 46b1 and 46b2.

As before, the phase sequence of the rotor coils is reversed with respect to the phase sequence of the stator coils. Thus, the coils 44a1 and 46b1 are connected in series. Likewise, the coils 44a2 and 44b2 are connected in series. Similarly, the coils 44b1 and 46a1 are connected in series, while the coil 44b2 is connected in series with the coil 46a2. The motor coils in FIG. 2 have the same designations as in FIG. 3. The motor system 40 of FIG. 2 utilizes a power supply 48 which operates from alternating current and thus is in the form of a frequency converter or cycloconverter. The alternating current power to energize the cycloconverter 48 is derived from alternating current powerlines 50a, b and c. While the power source is illustrated as having three phases, it will be understood that any suitable number of phases may be employed. A master switch 52 with three poles 52a, b and c is preferably connected in series with the supply lines 50a, b and c.

Each set of motor coils is supplied with power by three controlled rectifiers, or other suitable control devices, connected between the three supply phases and the particular set of coils. Thus, silicon controlled rectifiers 54a, b and c are connected from the powerlines 50a, b and c to the coils 44a1 and 46b1. Likewise, silicon control rectifiers 56a, b and c are connected from the supply lines 50a, b and c to the coils 44a2 and 46b2. Similarly, silicon control rectifiers 58a, b and c are connected from the lines 50a, b and c to the coils 44b1 and 46a1. Finally, silicon control rectifiers 60a, b and c are connected between the lines 50a, b and c and the coils 44b2 and 46a2.

In the system of FIG. 2 all of the coils are returned to a common line 62. Diode rectifiers 64a, b and c are connected between the line 62 and the supply lines 50a, b and c. The polarization of the rectifiers 64a, b and c is opposite to that of the silicon control rectifiers 54a–60c.

It will be understood that additional motor rectifiers may be employed if desired. Thus, for example, the motor 42 may be of the three-phase type, in which case additional motor coils and silicon control rectifiers will be utilized.

The firing of the silicon control rectifiers 54a–60c is controlled by a shaft position transducer 64 having a rotary element 66 which is connected to the shaft 68 of the rotor 46. As before, a speed reducing device 70 is connected between the motor shaft 68 and the rotary element 66 of the transducer 64. For the illustrated two-pole machine, the speed reducing device 70 has a ratio of 1 to 2, so that the rotary element 66 of the transducer 64 operates at one-half the speed of the motor shaft 68.

The shaft position transducer is of the type which modulates a carrier signal. Such signal may be supplied by a radiofrequency generator 72. To modulate the carrier signal, the transducer 64 preferably employs a plurality of rotary variable capacitors, one for each motor phase. Thus, the illustrated transducer 64 comprises rotary capacitors 74a and b having rotor plates 76a and b. The rotary capacitor 74a has two sets of stator plates 78a and 80a. Likewise, capacitor 74b has two sets of stator plates 78b and 80b.

The rotary variable capacitors 74a and b are connected to the associated silicon control rectifiers in the same manner. It will suffice, therefore, to describe the connections employed for the capacitor 74a.

The rotor 76a of the capacitor 74a is grounded. Likewise, one side of the radiofrequency generator 72 is grounded. Transformers 82a and b are employed in connection with the stator plates 78a and b. Thus, the primary winding of the transformer 82a is connected between the stator plate 78a and a line 84 leading to the ungrounded side of the generator 72. Similarly, the primary winding of the transformer 82b is connected between the stator plate 80a and the line 84.

The secondary winding of the transformer 62a is connected through a full wave bridge rectifier 86a and resistances 88a to the control electrodes or gates of the silicon controlled rectifiers 54a, b and c. In like manner, the secondary winding of the transformer 82b is connected to the gates of the silicon control rectifiers 56a, b and c through a bridge rectifier 86b and resistances 88b.

Thus, the silicon controlled rectifiers are rendered conductive when signals are received from the shaft position transducer. There is a phase difference of 90° between the rotors 76a and b of the variable capacitors 74a and b. As a result, there is a phase difference of 90° between the voltages supplied to the two sets of armature coils of the motor. The first set comprises the coils 44a1, 44a2, 46b1 and 46b2. The second set comprises the coils 44b1, 44b2, 46a1 and 46a2. The stator plates 78a, 78b, 80a and 80b are preferably constructed and arranged for angular adjustment, so that the phase angle of the power supply output voltage can be varied, to change the speed of the motor.

It is understood that the invention may be applied to a three-phase induction motor. Such an application requires the provision of three rotary variable capacitors in the shaft position transducer. In that case, there is a displacement of 120° between the successive rotors.

FIGS. 4 and 5 illustrate a modified shaft position transducer 94 utilizing magnetodiodes. Such diodes are solid-state devices which are responsive to magnetic fields. The resistance of such diodes is changed in response to changing magnetic fields.

The transducer 94 of FIG. 4 is intended for use with a three-phase induction motor. Thus, the transducer utilizes three magnetodiodes 96a, b and c, located on a stator 97 adjacent a rotary magnet 98, preferably a permanent magnet. The magnet 98 is arranged to be rotated by the shaft of the motor, as in the case of the rotary elements of the transducer 64, shown in FIG. 2. The magnetodiodes 96a, b and c of FIG. 4 are spaced apart at equal angular intervals of 120°, about the rotary axis of the magnet 98.

FIG. 5 illustrates the circuit which may be employed in connection with the magnetodiode 96a. Similar circuit connections are employed for the magnetodiodes 96b and c. Thus, it will suffice to describe the circuit of FIG. 5.

It will be seen that the magnetodiode 96a comprises two diode elements 96a1 and 2, connected in a bridge arrangement with two resistors 98 and 100, and a balancing potentiometer 102. The movable tap 104 of the potentiometer 102 is employed as one of the output terminals and is grounded in FIG. 5. The other output terminal 106 is connected to the junction between the diode elements 96a1 and 2.

A battery 108 and a potentiometer 110 are employed to energize the bridge circuit, comprising the diode elements 96a1 and 2 and the resistors 98, 100 and 102. It will be understood that the battery 108 represents any suitable source of direct current.

The rotation of the magnet 98 varies the strength and polarity of the magnetic field at each of the magnetodiodes 96a, b and c. The corresponding variations in the resistance of the diodes are reflected as voltage variations at the output terminals 104 and 106. These variable voltages are coupled to the control electrodes of the silicon controlled rectifiers, in much the same manner as illustrated in FIG. 2.

The angular position of the stator 97 can be varied to change the phase angle of the signals from the magnetodiodes. In this way, the speed of the motor can be varied.

FIG. 6 comprises graphs or curves representing the characteristics of the motor system of the present invention. The speed of the motor is plotted against the torque developed by the motor in the solid line curves, for different values of the torque angle. The dotted line curves represent the variation of the motor current with the developed torque. The various curves are for the following values of the torque angle:

| Curve Number | Torque Angle—Degrees |
| --- | --- |
| 1 | 169 |
| 2 | 146.5 |
| 3 | 124 |
| 4 | 101.5 |
| 5 | 79 |

It will be seen from the graphs of FIG. 6 that the characteristics of the motor system are quite similar to those of a series field direct current motor. The motor system of the present invention is characterized by high starting torque and high overload torque. In particular, the overload torque is two or three times as great as can be obtained from the same motor connected as an ordinary induction motor.

Inasmuch as the system utilizes both the stator and the rotor as armatures, high efficiency and power output are achieved. Thus, more power output is achieved for a given size of the motor. For a particular power output the size of the motor can be minimized.

I claim:

1. An electrical drive system, comprising a plural-phase double armature induction motor having a stator with a wound stator armature and a rotor with a wound rotor armature, said stator armature having a set of plural-phase stator windings, said rotor armature having a set of plural-phase rotor windings, a variable frequency power supply, means for connecting said stator and rotor windings to said variable frequency power supply for energizing said stator windings with one phase sequence while energizing said rotor windings with the opposite sequence of phase rotation, the energization of said stator windings thereby producing a stator magnetic field rotating in one direction relative to said stator, the energization of said rotor windings thereby producing a rotor magnetic field rotating in the opposite direction relative to said rotor, and a transducer having a rotatable element connected to said rotor, said transducer having means operable by said rotatable element for producing a control signal at one-half the angular velocity of said rotor, said transducer having control means responsive to said control signal and connected to said power supply to cause said power supply to generate alternating current power corresponding in angular velocity and phase to one-half the angular velocity and phase position of said rotor.

2. A system according to claim 1, in which said transducer is constructed to provide an adjustable torque angle between the energizing power and the rotary position of said rotor.

3. A system according to claim 1, in which said control means of said transducer comprises a source of carrier signal, and a rotary capacitor operable by the rotor and connected between said source and said power supply.

4. A system according to claim 1, in which said control means of said transducer comprises a rotatable magnet connected to said rotor, and at least one magneto-responsive element adjacent said magnet and connected to said power supply.

5. A system according to claim 4, in which said magneto-responsive element comprises a magnetodiode.

6. A system according to claim 5, in which said magnetodiode has a resistance which is variable in response to a varying magnetic field.

7. A system according to claim 1, in which said power supply comprises a cycloconverter operable by alternating current power of a fixed frequency and capable of producing an alternating current output at a variable frequency.

8. A system according to claim 7, in which said cycloconverter comprises solid-state devices having control elements connected to said control means of said transducer.

9. A system according to claim 7, in which said cycloconverter comprises controlled rectifiers having control elements connected to said control means of said transducer.

10. A system according to claim 1, in which said power supply comprises an inverter operative to convert direct current power to variable frequency alternating current power.

11. A system according to claim 1, including speed control means connected to said power supply for varying the voltage output of said power supply.

12. A system according to claim 11, including a tachometer operable by said rotor and connected to said speed control means to regulate the speed of said rotor.

13. A system according to claim 1,
including means for varying the output phase angle of said transducer to change the phase angle of the output from said power supply.

14. A system according to claim 1,
in which said transducer comprises a rotor and a stator, said system comprising means for adjusting the angular position of said transducer stator so as to vary the output phase angle of said transducer.

15. A system according to claim 1,
including a phase shifter for changing the phase angle of said signal so as to vary the phase angle of the output from said power supply.